United States Patent Office 3,303,611
Patented Feb. 14, 1967

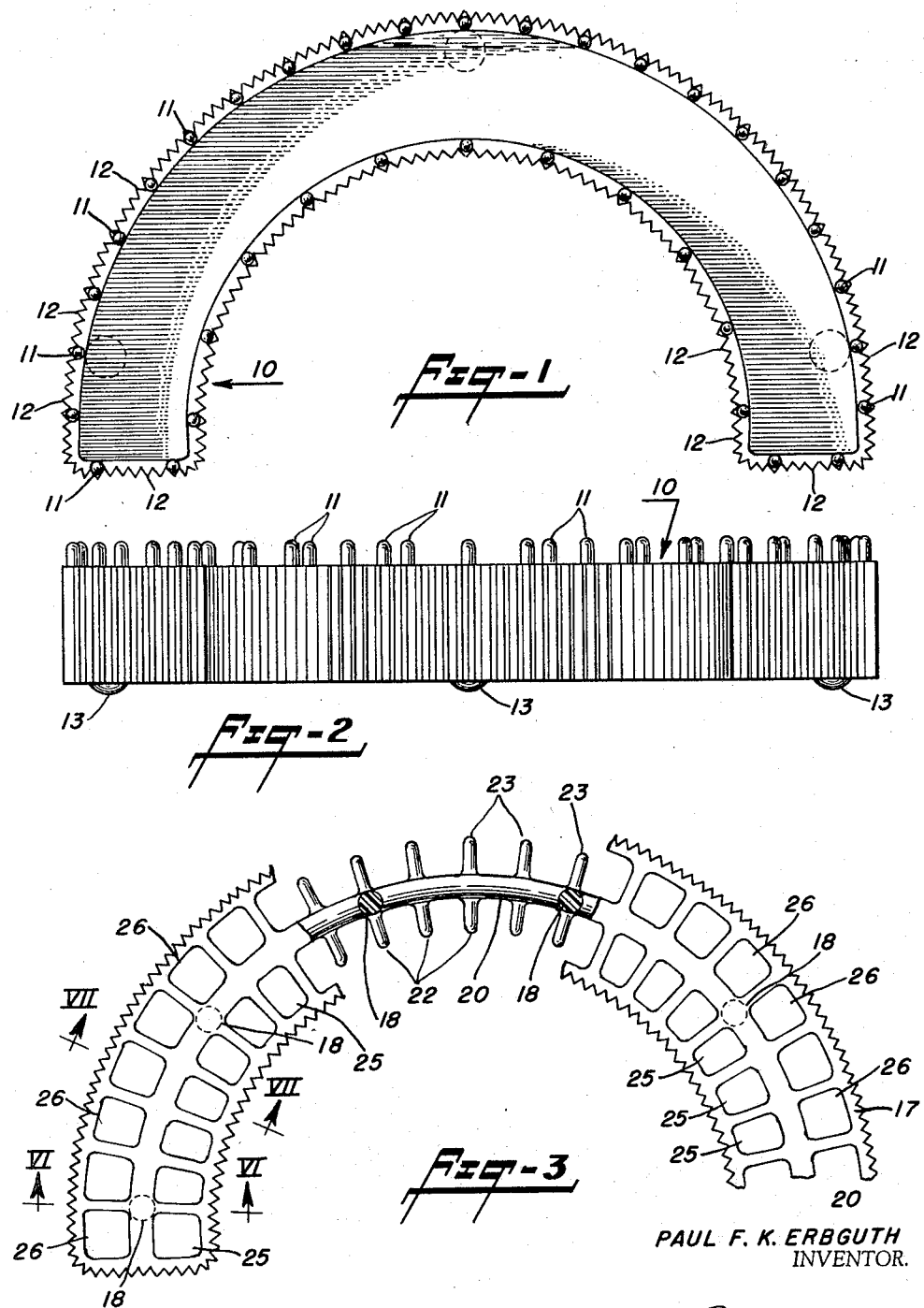

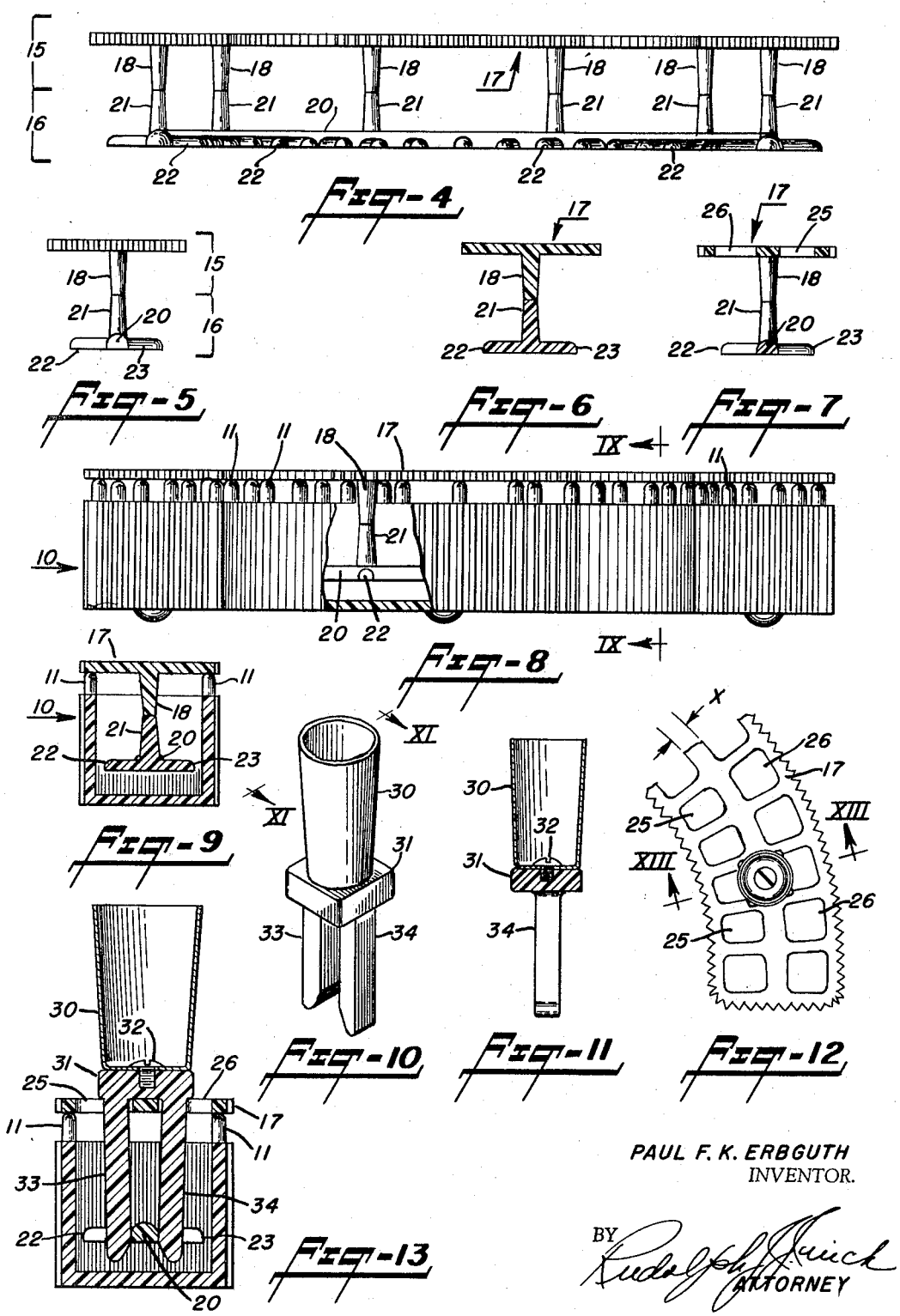

3,303,611
FLOWER HOLDER
Paul F. K. Erbguth, 120 Station Road,
Great Neck, N.Y. 11023
Filed Aug. 21, 1964, Ser. No. 391,213
6 Claims. (Cl. 47—41.11)

This invention relates to a holder for cut flowers and more particularly to a device of this class constructed and arranged to serve as a combined flower and candle holder and which is useful as a center piece for a table.

An object of this invention is the provision of a flower holder having means for retaining flowers, or the like, in substantially upright position and provided with means for removably supporting a candle holder.

An object of this invention is the provision of a flower holder comprising a case for containing water and a removable insert, said insert being constructed and arranged to support the stems of cut flowers substantially in a vertical position and being provided with means for attaching a candle holder thereto.

An object of this invention is the provision of a combined flower and candle holder comprising an open ended case for containing water, a removable insert member supported by the case and extending thereinto, said insert member having a plurality of aligned openings for supporting flowers in substantially vertical position, and a candle holder removably attached to said insert member.

These and other objects of the invention will become apparent from the following description when taken with the accompanying drawings. It will be understood, however, that the drawings are for purposes of illustration and are not to be construed as defining the scope or limits of the invention reference being had for the latter purpose to the claims appended hereto.

In the drawings wherein like reference characters denote like parts in the several views;

FIGURE 1 is a top plan view showing the case of a flower holder made in accordance with this invention;

FIGURE 2 is a front elevational view thereof;

FIGURE 3 is a top plan view of the insert member with a central portion broken away;

FIGURE 4 is a front elevational view thereof;

FIGURE 5 is an end elevational view thereof;

FIGURE 6 is a vertical, cross-sectional view taken along the line VI—VI of FIGURE 3;

FIGURE 7 is a similar cross-sectional view taken along the line VII—VII of FIGURE 3;

FIGURE 8 is a front elevational view of the assembled flower holder, that is, with the insert assembled to the case and with a portion of the front wall of the case broken away;

FIGURE 9 is a cross-sectional view taken along the line IX—IX of FIGURE 8;

FIGURE 10 is an isometric view of a candle holder constructed for use in combination with the flower holder;

FIGURE 11 is a vertical, cross-sectional view thereof taken along the line XI—XI of FIGURE 10;

FIGURE 12 is a fragmentary, top plan view of the flower holder with the candle holder attached thereto; and FIGURE 13 is an enlarged cross-sectional view taken along the line XIII—XIII of FIGURE 12.

Reference now is made to FIGURES 1 and 2 which are, respectively, plan and front elevational views of the case generally identified by the numeral 10. The particular case shown in the drawings is of a crescent or semi-circular shape, but it will be apparent, from the following description, that the novel features of the invention are adapted for incorporation in flower holders of other overall shapes. The case is molded of a suitable plastic with integral, spaced pins 11 extending upwardly from the open end. The outer side and end walls of the case are formed of V-shaped grooves terminating in a plurality of longitudinally-extending, pointed flutes 12, and the case bottom includes the three integral supports, or feet, 13. This case serves as a container for water and as a support for the insert member, as will be described hereinbelow.

The insert member, also molded of plastic, is shown in FIGURES 3–5, which figures are top, front and end views, respectively. This insert member is molded in two pieces, specifically, an upper portion identified by the numeral 15 and a lower portion identified by the numeral 16, in FIGURES 4 and 5. The upper portion comprises a plate 17 having a plurality of integral downwardly-directed posts 18. The plate 17 has a size and shape corresponding to the size and shape of the case 10 (see FIGURE 1) and the peripheral surface thereof is fluted to match the fluted outer walls of the case. The lower portion 16, of the insert member, comprises an arcuate bar 20 having a plurality of integral, upstanding posts 21 corresponding to the similar posts 18, of the upper insert portion 15. A plurality of radially-extending fingers 22 and 23 are formed integral with the arcuate rod 20. Corresponding pairs of the posts 18 and 21 are cemented together to form the complete insert member. When so assembled together, the arcuate bar 20 is centrally disposed relative to the upper plate 17.

The upper plate 17, of the insert member, is provided with a plurality of radially-aligned openings 25 and 26. When viewed from the top, each pair of the radially-aligned fingers 22 and 23 are positioned between the overlying radially-aligned pairs of the openings 25 and 26. This arrangement is clearly shown in FIGURES 6 and 7, which are enlarged, cross-sectional views taken along the lines VI—VI and VII—VII, respectively, of FIGURE 3. The vertical plane of the section shown in FIGURE 6 passes through the solid portion of the upper plate 17 and its integral post 18, as well as through the fingers 22, 23, the bar 20 and the integral post 21. On the other hand, the plane of the section shown in FIGURE 7 passes through the rod 20 and intersects the aligned set of openings 25 and 26 formed in the upper plate 17.

The overall, arcuate length of the bar 20, of the insert member, is somewhat less than that of the upper plate 17. Specifically, the ends of the bar 20 are recessed from the corresponding ends of the plate 17 by an amount slightly greater than the thickness of the end walls of the case. When the insert member is assembled to the case, as shown in FIGURES 8 and 9, the upper plate 17, of the insert member, is supported on the upstanding pins 11, of the case, and the bar 20 is spaced somewhat from the case bottom. The ends of the bar 20 are spaced only slightly from the inner walls of the case ends, thereby preventing significant, relative movement between the case and the insert member. Further, as shown in FIGURE 9, the ends of the insert fingers 22 and 23 are spaced a small distance from the inner walls of the case sides.

It will now be clear that each pair of adjacent fingers 22, together with the front wall of the case, define lower openings which are aligned with the corresponding openings 25 formed in the upper plate 17. Similarly, the adjacent pairs of fingers 23, together with the rear wall of the case, define lower openings which are aligned with the corresponding plate openings 26. Thus, the stems of flowers can be inserted into such vertically-aligned openings to rest upon the bottom of the case. Inasmuch as such vertically-aligned openings are spaced apart an appreciable distance, the flowers are retained substantially in vertical position. It may also here be pointed out that flowers, greens, or etc. can be inserted into the water, carried by the case, through the side openings defined by adjacent pins 11, thereby to obscure as much of the flower holder as desired.

Two flower holders, of semi-circular shape, may be placed together to form a circle, and, when filled with a variety of flowers, greens and ornaments, result in a pleasing table decoration. Further, such semi-circular flower holders can be combined with similar holders of other shapes to thereby provide various floral arrangements which can be combined with various figurines, positioned between the flower holders, to produce esthetic center pieces.

A flower holder, made in accordance with this invention, is particularly constructed to support one or more candles, thereby elimintaing the requirement for conventional candlesticks or holders.

Reference now is made to FIGURES 10 and 11, which show a candle holder adapted for removable attachment to the flower holder. Such holder comprises a metal tube, or ferrule, 30 secured to the base 31 of a clip-on member, as by a screw 32. Such clip-on member, comprising the base 31 and integral prongs 33, 34, preferably is molded of a siutable plastic, such as, for example, polyethelene, so that the prongs will have a certain amount of resiliency. The spacing between the prongs, at the base 31, is slightly greater than the lateral spacing being aligned sets of the openings 25, 26 formed in the top plate of the insert member, such spacing being identified by the letter (X), see FIGURE 12, which is a fragmentary, top plan view of the assembled flower holder. The lateral spacing of the prongs, at the lower free ends thereof, is somewhat less than the distance (X).

The candle holder is attached to the flower holder by inserting the ends of the prongs through a selected set of radially-aligned openings 25, 26, in the upper plate 17 (as shown in FIGURE 12) until the base portion 31 rests upon the upper surface of such plate. As shown in FIGURE 13, which is an enlarged, cross-sectional view taken along the line XIII—XIII of FIGURE 12, the prongs 33 and 34 are forced apart and firmly engage the bar 20, when the base 31, of the candle holder, rests upon the upper plate 17. The facing surfaces of the prong ends are tapered, thereby to facilitate a spreading apart of the prongs as they are pressed downwardly through the apertures 25, 26 and over the bar 20. With the flat surface of the base 31 resting upon the plate 17 and with the spaced-apart prongs exerting a reasonable pressure against the bar 20, the candle holder is reatined in a stable, upright position.

One or more candle holders can be attached to the flower holder and ferrules of various sizes can be provided for accommodating candles of different sizes.

Preferably, the case and the insert member of the flower holder are molded of a clear plastic, whereby the fluted configuraiton of the outer case walls and the peripheral surface of the upper insert plate create a pleasing appearance, comparable to cut glass.

Having now given a detailed description of the invention, those skilled in this art will be able to make various changes and modifications without thereby departing from the scope and spirit of the invention as recited in the following claims.

I claim:
1. A flower holder comprising,
 (a) a case open at one end and having spaced pins extending from the open end,
 (b) an insert member supported on said pins and extending into the case,
 (c) means forming upper and lower sets of spaced, vertically-aligned openings in said insert member, and
 (d) a candle-receiving ferrule secured to a pair of spaced prong members which pass through adjacent sets of the said openings, the lower portions of said prong members clampingly engaging the common wall defining the spacing between the lower openings of such sets.
2. A flower holder comprising,
 (a) an elongated case open at one end and having spaced pins extending upwardly from the open end,
 (b) a plate having a size and shape corresponding to the open end of the case, said case being supported on said pins and having sets of laterally-spaced openings formed therein,
 (c) a bar carried by said plate, said bar being spaced from the case bottom and substantially equally spaced from opposed side walls of the case, and
 (d) spaced sets of aligned fingers extending laterally from said bar, each set of fingers having ends terminating proximate to a side wall of the case such that adjacent sets of said fingers and the proximate side walls of the case define openings which are in substantial vertical alignment with the openings formed in said plate.
3. The invention as recited in claim 2, wherein the case and plate are molded of plastic, and wherein the outer surfaces of the case and the peripheral surface of the plate are formed of parallel, vertically-extending flutes.
4. The invention as recited in claim 3, wherein said flutes are defined by adjacently-disposed V-shaped grooves.
5. The invention as recited in claim 3, in combination with a candle holder extending upwardly from the said plate, said candle holder comprising a candle-receiving shell secured to a flat base member having integral, spaced prongs extending therefrom, said prongs extending through a lateraly-spaced set of openings formed in said plate and clampingly engaging the said bar in a region between adjacent sets of said fingers.
6. The invention as recited in claim 5, wherein the said base member and prongs are an integral unit molded of plastic, and wherein said shell is removably-secured to the said base member.

References Cited by the Examiner
UNITED STATES PATENTS 2,527,706  10/1950  Curtis _____ 67—25
2,898,755   8/1959  Josephson _____ 67—25

ANTONIO F. GUIDA, *Acting Primary Examiner.*
ABRAHAM G. STONE, *Examiner.*
P. A. RAZZANO, *Assistant Examiner.*